United States Patent
Shah et al.

(10) Patent No.: US 10,691,434 B2
(45) Date of Patent: Jun. 23, 2020

(54) SYSTEM AND METHOD FOR CONVERTING A FIRST PROGRAMMING LANGUAGE APPLICATION TO A SECOND PROGRAMMING LANGUAGE APPLICATION

(71) Applicants: Ghulam Nabi Shah, Franklin Park, NJ (US); Ron O. Mueller, Neshanic Station, NJ (US)

(72) Inventors: Ghulam Nabi Shah, Franklin Park, NJ (US); Ron O. Mueller, Neshanic Station, NJ (US)

(73) Assignee: Macrosoft, Inc., Parsippany, NJ (US)

( * ) Notice: Subject to any disclaimer, the term of this patent is extended or adjusted under 35 U.S.C. 154(b) by 0 days.

(21) Appl. No.: 16/272,737

(22) Filed: Feb. 11, 2019

(65) Prior Publication Data

US 2019/0250895 A1 Aug. 15, 2019

Related U.S. Application Data

(60) Provisional application No. 62/628,368, filed on Feb. 9, 2018.

(51) Int. Cl.
| | | |
|---|---|---|
| *G06F 9/45* | (2006.01) | |
| *G06F 8/51* | (2018.01) | |
| *G06F 8/41* | (2018.01) | |
| *G06F 8/30* | (2018.01) | |
| *G06F 40/151* | (2020.01) | |

(52) U.S. Cl.
CPC .............. *G06F 8/51* (2013.01); *G06F 8/30* (2013.01); *G06F 8/315* (2013.01); *G06F 8/427* (2013.01); *G06F 40/151* (2020.01)

(58) Field of Classification Search
CPC .......... G06F 40/126; G06F 40/14; G06F 8/30; G06F 8/51; G06F 8/427; G06F 40/151
See application file for complete search history.

(56) References Cited

U.S. PATENT DOCUMENTS

| | | |
|---|---|---|
| 6,453,464 B1 | 9/2002 | Sullivan |
| 7,117,486 B2 | 10/2006 | Wong et al. |
| 7,467,375 B2 | 12/2008 | Tondreau et al. |
| 7,533,102 B2 | 5/2009 | Kalia et al. |

(Continued)

OTHER PUBLICATIONS

Shah, G.N., et al., "CodeMORPH 1.0—Macrosoft's Newest and Most Significant Automation Tool for VFP Code Conversions is ready for Production Use"; Macrosoft; Feb. 28, 2018; https://cdn2.hubspot.net/hubfs/3301418/Downloads/CodeMorph.3.final.pdf?t=1539893221082.

(Continued)

*Primary Examiner* — Tuan A Vu
(74) *Attorney, Agent, or Firm* — Cardinal Law Group

(57) ABSTRACT

A method for converting a first programming language application to a second programming language application, including: generating for the first programming language application a listing of source application files; iterating through the first programming language application files to generate tokens from the files source code; based thereon, building a dictionary for the first programming language application; generating second programming language application files with the dictionary; and stitching the second programming language application files together into the second programming language application.

20 Claims, 5 Drawing Sheets

(56) References Cited

U.S. PATENT DOCUMENTS

| | | |
|---|---|---|
| 8,516,435 B2 | 8/2013 | Akkiraju et al. |
| 8,533,690 B2 | 9/2013 | McAtamney |
| 8,539,456 B2 | 9/2013 | Supalov et al. |
| 9,063,765 B2 | 6/2015 | Fallows |
| 9,158,538 B2 | 10/2015 | Nicholls et al. |
| 9,239,710 B2 | 1/2016 | Araya et al. |
| 9,317,266 B1 | 4/2016 | Muldoon |
| 9,804,946 B2 | 10/2017 | Conlon et al. |
| 2007/0055964 A1 | 3/2007 | Mirkazemi et al. |
| 2008/0250231 A1 | 10/2008 | Tagawa et al. |
| 2008/0306986 A1 | 12/2008 | Doyle, Sr. |
| 2011/0078211 A1* | 3/2011 | Gass ............... G06F 8/65 707/803 |
| 2012/0304047 A1* | 11/2012 | Gharavy ........... G06F 40/14 715/234 |
| 2013/0227533 A1 | 8/2013 | Tonkin et al. |
| 2015/0057993 A1* | 2/2015 | Phadke ........... G06F 40/126 704/3 |

OTHER PUBLICATIONS

Putrycz, E., et al., "Recovering business Rules from Legacy Source Code for System Modernization", Proceedings of The International Workshop on Rules and Rule Markup Languages for the Semantic Web, pp. 107-118. Springer, Berlin, Heidelberg, Oct. 25, 2007.
Krill, Paul, "Microsoft adds Expression tools to MSDN; Company also addresses challenges to the FoxPro discontinuance", InfoWorld. com: NA. InfoWorld Media Group, Inc., Apr. 3, 2007.

* cited by examiner

SYSTEM AND METHOD FOR CONVERTING A FIRST PROGRAMMING LANGUAGE APPLICATION TO A SECOND PROGRAMMING LANGUAGE APPLICATION

This patent application claims benefit and priority from U.S. Provisional Patent Application Ser. No. 62/628,368, by Shah, et al., filed on Feb. 9, 2018, and which is hereby incorporated by reference in its entirety.

FIELD OF INVENTION

The technical field of this disclosure is systems and methods for programming language applications, particularly, programming language application conversion systems and methods.

BACKGROUND

Visual Fox Pro (VFP) is a data-centric and object-oriented programming language and integrated development environment (IDE) developed by Microsoft. VFP was once popular and many companies developed large-scale, complex, business critical applications based on VFP. Microsoft announced the end-of-life for VFP in 2007. In January 2015, Microsoft ended extended support. To the dismay of many VFP application owners, Microsoft provided no single automated tool to convert legacy VFP applications to newer technology platforms.

Planning for software obsolescence (end-of-life) is a common activity in any medium to large company with an IT organization. However, planning for software obsolescence becomes more difficult when the obsolescence is related to large-scale, complex, business critical applications. The unavailability of a single automated tool to assist with these large-scale software migration projects makes planning even more difficult. Both of these difficulties hamper VFP obsolescence plans. As a result, VFP application owners face a dilemma. On the one hand, these owners may continue to run their legacy, business critical, VFP applications. This approach poses two problems. One, running legacy VFP applications in a modern IT infrastructure creates security risks. For example, VFP applications (lacking built-in security features common in modern programming languages) are susceptible to SQL injection and privilege escalation hacker exploits. Two, running VFP applications in a modern IT infrastructure often introduces performance bottlenecks (e.g. network overload). On the other hand, these owners may migrate business critical VFP applications to newer technology (e.g., Microsoft.NET). Unfortunately, structured migration of large-scale, complex VFP applications to newer technology can be a costly proposition. Many VFP migration projects require a dedicated team of professionals, working full time, for years. The business logic in the VFP applications must be hand translated into pseudo code and later re-written into the target programming language. Obviously, the structured migration of VFP applications is subject to errors. Furthermore, any attempts to leverage third-party VFP converters is not very helpful. These third-party VFP converters often do not produce useful target code and do not preserve the business logic of the original VFP applications.

It would be desirable to have systems and methods for converting a First Programming Language Application to a Second Programming Language Application that would overcome the above disadvantages.

SUMMARY OF THE INVENTION

This disclosure details the systems and methods for converting a first programming language application (i.e. Visual Fox Pro application) to a second programming language application (i.e. Microsoft.NET application). The embodiments of the invention use a multi-stage process to generate Microsoft.NET target code that preserves the business logic of the VFP application, within a modern MVC framework. Those skilled in the art will appreciate that systems and methods used herein may be applied in other contexts, although the best mode is described in detailed.

In one embodiment, the computer-implemented method for converting a First Programming Language Application to a Second Programming Language Application includes receiving for the First Programming Language Application a Grammar file, Source Project, and Target Project, the First Programming Language Application having backend databases coupled to graphic user interfaces; generating tabular data for the Source Project; generating for the First Programming Language Application a listing of Source Application files and Source Project files; generating blank code files for the Second Programming Language Application; iterating through First Programming Language Application files to generate corresponding Second Programming Language Application files, wherein one or more of the First Programming Language Application files contains codebehind; setting up a Second Programming Language Application target project containing Second Programming Language Application files; converting First Programming Language Application modules to generate corresponding Second Programming Language Application files; building a dictionary for the First Programming Language Application by executing a first pass through the First Programming Language Application; generating Second Programming Language Application files with the dictionary in the form of a plurality of controller functions, classes and report expressions by executing a second pass; and stitching the Second Programming Language Application files together into the Second Programming Language Application, the Second Programming Language Application having core functionality separated from user interface behavior.

In another embodiment, the computer-implemented system for migrating a First Programming Language Application to a Second Programming Language Application, preserving the business logic of the First Programming Language Application includes a processor; and a memory communicatively coupled to the processor. The memory stores processor instructions, which, on execution, cause the processor to: receive for the First Programming Language Application a Grammar file, Source Project, and Target Project, the First Programming Language Application having backend databases coupled to graphic user interfaces; generate tabular data for the Source Project; generate for the First Programming Language Application a listing of Source Application files and Source Project files; generate blank code files for the Second Programming Language Application; iterate through First Programming Language Application files to generate corresponding Second Programming Language Application files, wherein one or more of the First Programming Language Application files contains codebehind; set up a Second Programming Language Application target project containing Second Programming Language Application files; convert First Programming Language Application modules to generate corresponding Second Programming Language Application files; build a dictionary for the First Programming Language Application by executing a first pass through the First Programming Language Application; generate Second Programming Language Application files with the dictionary in the form of a plurality of controller functions, classes and report expressions by executing a second pass; and stitch the Second Programming Language Application files together into the Second Programming Language Application, the Second Programming Language Application having core functionality separated from user interface behavior.

In another embodiment, the system for migrating a of First Programming Language Application to a Second Programming Language Application, the First Programming Language Application having backend databases coupled to graphic user interfaces and the Second Programming Language Application having core functionality separated from user interface behavior includes: a Grammar Lexer configured to receive a Grammar file and a stream of First Programming Language Application source code and generate tokens; a Grammar Parser configured to receive the tokens and to generate a parse tree, verifying that the tokens adhere to syntax rules in the Grammar file; a Dictionary Builder configured to receive the tokens and to parse trees and populate a dictionary, the Dictionary Builder being further configured to generate for the of First Programming Language Application a listing of standard types, custom types, and scopes; and an Output Generator configured to receive the dictionary and a project index for the of First Programming Language Application and to generate Second Programming Language Application code for each of the of First Programming Language Application files, converting each First Programming Language Application file into the corresponding Second Programming Language Application file.

Other aspects of the invention shall become apparent from the detailed description, taken in conjunction with the accompanying drawings, illustrating by way of the example the principles of embodiments described in the present disclosure.

DETAILED DESCRIPTION

Figure 1:
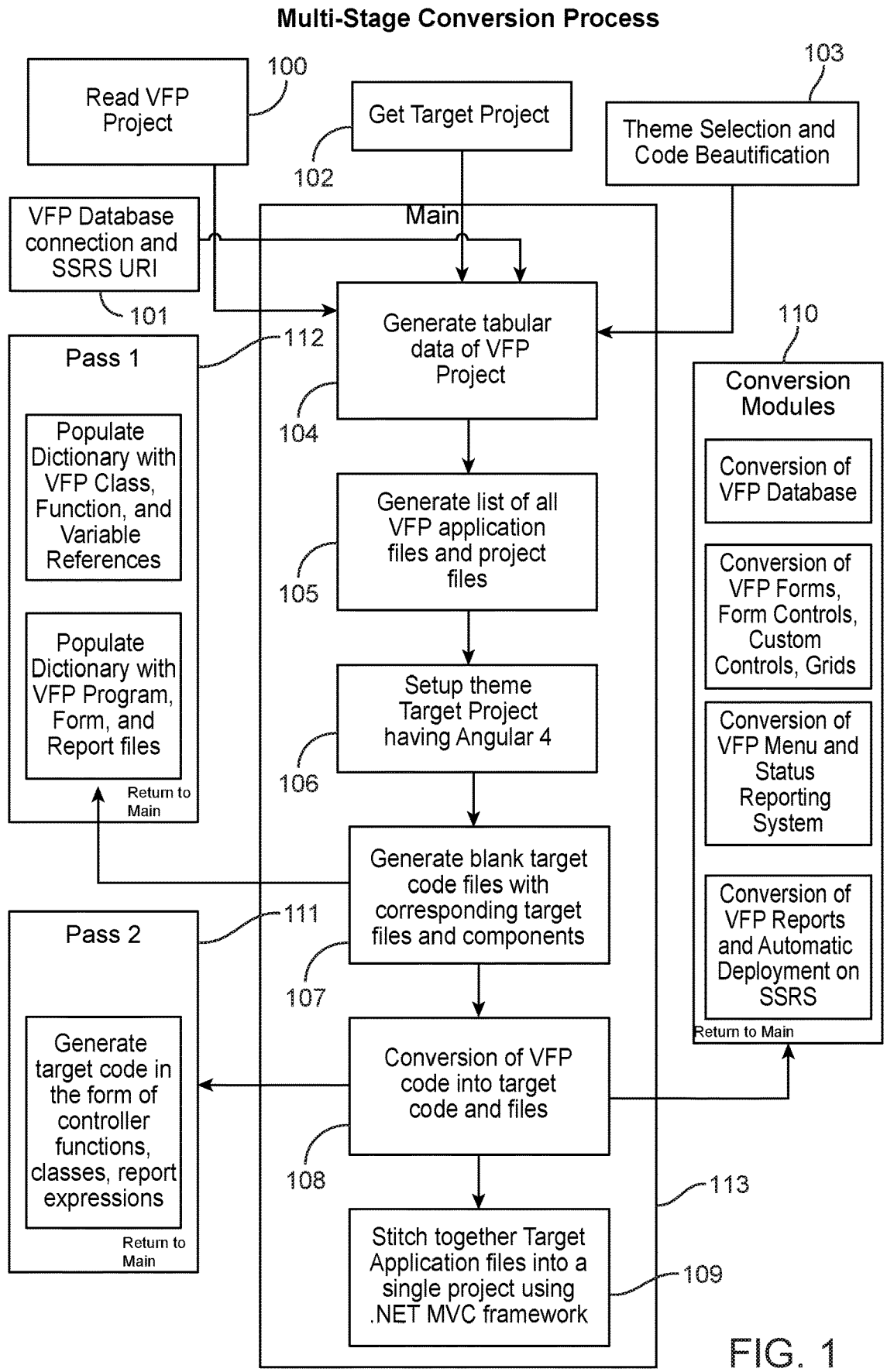
FIG. 1 is a work flow diagram of one embodiment of a method for converting a First Programming Language Application to a Second Programming Language Application in accordance with the invention.

This document discloses systems and methods for converting a first programming language application (Visual FoxPro and/or FoxPro 2.x source code) to a second programming language application (Microsoft.NET target code). The resulting Microsoft.NET target code is consistent with the modern MVC framework, while preserving the original business logic of the VFP application. It should be understood that term "VFP application" or "VFP" used herein is defined as "Visual FoxPro" and/or "FoxPro 2.x." It should be understood that term Microsoft.NET used herein is defined as web-based ASP.NET MVC version 4.5 framework in the C# language and Angular JS. Additionally, it should be understood that the term "source" generally refers to an aspect of a first programming language application (i.e. VFP application). Also, it should be understood that the term "target" generally refers to an aspect of a second programming language application (i.e., Microsoft.NET application).

In computer programming, coupling is the degree of interdependence between software modules and a measure of how closely connected two routines or modules are. Generally speaking, programming languages/applications that exhibit low coupling are considered well-structured and designed well. On the other hand, programming languages/applications that exhibit high coupling are considered poorly structured and poorly designed. Being a data-centric (e.g. backend databases coupled to GUI) and object-oriented programming language and integrated development environment, a VFP application, by its intrinsic nature, exhibits high coupling. For example, the GUI (i.e., graphical user interface) of a VFP application may have VFP code embedded for querying backend databases. In this case, the GUI is highly coupled to the backend databases because the VFP code for querying the backend databases is located within the GUI of the VFP application. Therefore, the GUI is interdepended upon the VFP code for querying the backend databases and neither can be easily separated from the other. The first programming language application as used herein is characterized by high coupling.

The MVC (Model View Controller) design pattern framework is software paradigm for structuring low coupling modern software applications. The core functionality of a software application (structured with MVC) is separated from the UI (user interface) behavior. As a result, the software applications structured with a multi-layer architecture and a MVC framework are operationally more robust and easier to modify. In other words, MVC structured software applications exhibit low coupling. The second programming language application as used herein is characterized by low coupling.

For background, the following three sections describe the libraries used to implement some of the features of the disclosed invention and the structures/components of the first programming language (i.e., VFP) and the second programming language (i.e., Microsoft .NET).

ANTLR with the VFP ANTLR Grammar file
VFP Project
Microsoft.NET target project
ANTLR with the VFP ANTLR Grammar File ANTLR is an acronym for another tool for language recognition. The embodiments of the invention use the ANTLR library and ANTLR runtime to create parse trees and walk (traverse) the parse trees. The term "ANTLR" shall be used to refer to the ANTLR library and ANTLR runtime throughout this disclosure. Those skilled in the art will appreciate ANTLR, common principles of programming language grammar, and knowledge of the VFP language to construct the VFP ANTLR Grammar file.

In order for ANTLR to interpret the VFP source code, ANTLR must have access to the VFP grammar (i.e. VFP ANTLR Grammar file). The VFP grammar defines the rules and symbols of the VFP programming language. In addition, this VFP grammar must be in the ANTLR G4 format. The term "VFP ANTLR Grammar file" shall be used to refer to this VFP grammar in the ANTLR G4 format.

VFP Source Project

The VFP source project is read and one or more of the VFP application files (within the VFP source project) are iterated through. A VFP source project index, listing the VFP application files, is built. One or more of the five types of VFP application files may be encountered:

1. VFP Program Files (*.prg)
2. VFP Reports (*.frx)
3. VFP Forms (*.scx)
4. VFP Visual Controls (*.vcx)
5. VFP Menu (*.mnx)

A VFP application starts with a predefined VFP program file (or a VFP form). A VFP program file is the main source of VFP source code and typically contains the business logic of a VFP application. A VFP program file may also be used as a container for common and helper functions.

The second type of VFP application file is a VFP report. A VFP report typically contains code (code-behind) for querying one or more of VFP backend databases and displaying data.

Third, VFP forms are a type of VFP application file. A VFP form is a typically a visible container for VFP visual controls. In addition, VFP forms typically contains code (code-behind) for handling one or more of VFP forms and visual control events.

Next are the VFP visual controls. VFP visual controls are typically elements of VFP forms. VFP application users interact with VFP visual controls to obtain some output or function. VFP visual controls usually contain code (code-behind) for handling VFP visual control or user-generated events.

Last, the VFP menu is the fifth type of VFP application file. A VFP menu provides a menu for a VFP application. A VFP menu typically contains code for handling VFP menu events, as well as specifying the VFP menu's style and items.

After building a VFP source project index, the source code of each VFP application file is interpreted and cataloged.

The VFP source project also contains one or more VFP project files (*.pjx). Each VFP project file is read and cataloged. Various embodiments use the information in the VFP project files to create a corresponding Microsoft.NET target project file (i.e., Microsoft Visual Studio Solution).

Microsoft.NET Target Project

The Microsoft.NET target project is generated for the VFP source project. Specifically, the embodiments of the invention convert the VFP source project to the web-based ASP.NET MVC version 4.5 framework in the C# language and Angular JS. VFP project files are converted to the corresponding Microsoft.NET target project file (i.e., Microsoft Visual Studio Solution). VFP application files are converted to the corresponding Microsoft.NET application files, respectively. The names of the files created in the Microsoft.NET target project are consistent with the names of the files in the VFP source project.

Multi-Stage Code Conversion Method/Process

FIG. 1 is a work flow diagram of an embodiment of the invention. The invention generally follows the four-stage (i.e. multi-stage) process described in association with FIG. 1 to convert a VFP Application to a Microsoft.NET Application: 1) Main stage 113, 2) Module Conversion stage 110, 3) Pass 1 stage 112 (i.e., first pass), 4) Pass 2 stage 111 (i.e., second pass).

In the Main stage 113, the following are received as inputs: a location of the VFP project file 100, location of target folder 102, VFP Database connection and SSRS (SQL Server Reporting Services) and URL (Universal Resource Locator) 101, and Theme Selection and code Beautification configurations 103. First, the tabular data for the VFP project is generated 104. The tabular data is used to create Microsoft .NET/SQL Server back-end databases that run in-memory. Second, list of VFP application and project files is enumerated 105. Third, the Theme Project having Angular 4/5 for the Microsoft.NET Application is setup 106. Fourth, the blank output code files with corresponding target filenames and classes for the Microsoft.NET Application are generated 107. Last, the Main stage 113 passes execution control to the Pass 1 stage 112.

In the Pass 1 stage 112, the dictionary is populated. The dictionary is the same dictionary in the embodiments described in association with FIGS. 2, 3 & 4 below. The dictionary contains a listing of all the standard and custom types (i.e., VFP ANTLR tokens) used in the VFP Application. The dictionary may be one or more individual dictionaries. Finally, the Pass 1 stage 112 returns execution control to the Main stage 113.

In the Main stage 113, the execution control returns from the Pass 1 stage 112. Next, the conversion of the VFP code to Microsoft.NET target code is initiated. The Main stage 113 passes execution control to the Module Conversion stage 110.

In the Module Conversion stage 110, the VFP forms, form controls, custom controls, and grids (found within the VFP application) are converted to the corresponding Microsoft- .NET application files, respectively. The VFP menu, status-reporting systems are converted to the corresponding Microsoft.NET applications files, respectively. Also, the reports are converted and deployed automatically on the SSRS (SQL Server Reporting Services) server. Finally, the Module Conversion stage 110 passes execution control back to the Main stage 113.

In the Main stage 113, the execution control returns from the Module Conversion stage 110. Then, the Main stage 113 passes execution control to the Pass 2 stage 111.

In the Pass 2 stage 111, the Microsoft.NET target code in the form of controller functions, classes, reports and expressions is generated. Next, the Pass 2 stage 111 returns execution control back to the Main stage 113.

In the Main stage 113, the execution control returns from the Pass 2 stage 111. The Microsoft.NET Application files (and components) are stitched (combined) into a single Microsoft.NET project using the Microsoft.NET MVC framework.

Although the stages in the four-stage process described above were described in a specific order, it should be understood that other stages may be performed among the in the four stages, or stages may be performed in an order other than that described, or stages may be adjusted so that they occur at slightly different times.

Components

Above, described in association with FIG. 1, discussed the general multi-stage conversion method/process for the invention. This section details the components of the invention used for processing the VFP code and generating the Microsoft.NET code, within the multi-stage conversion method/process.

Figure 2:
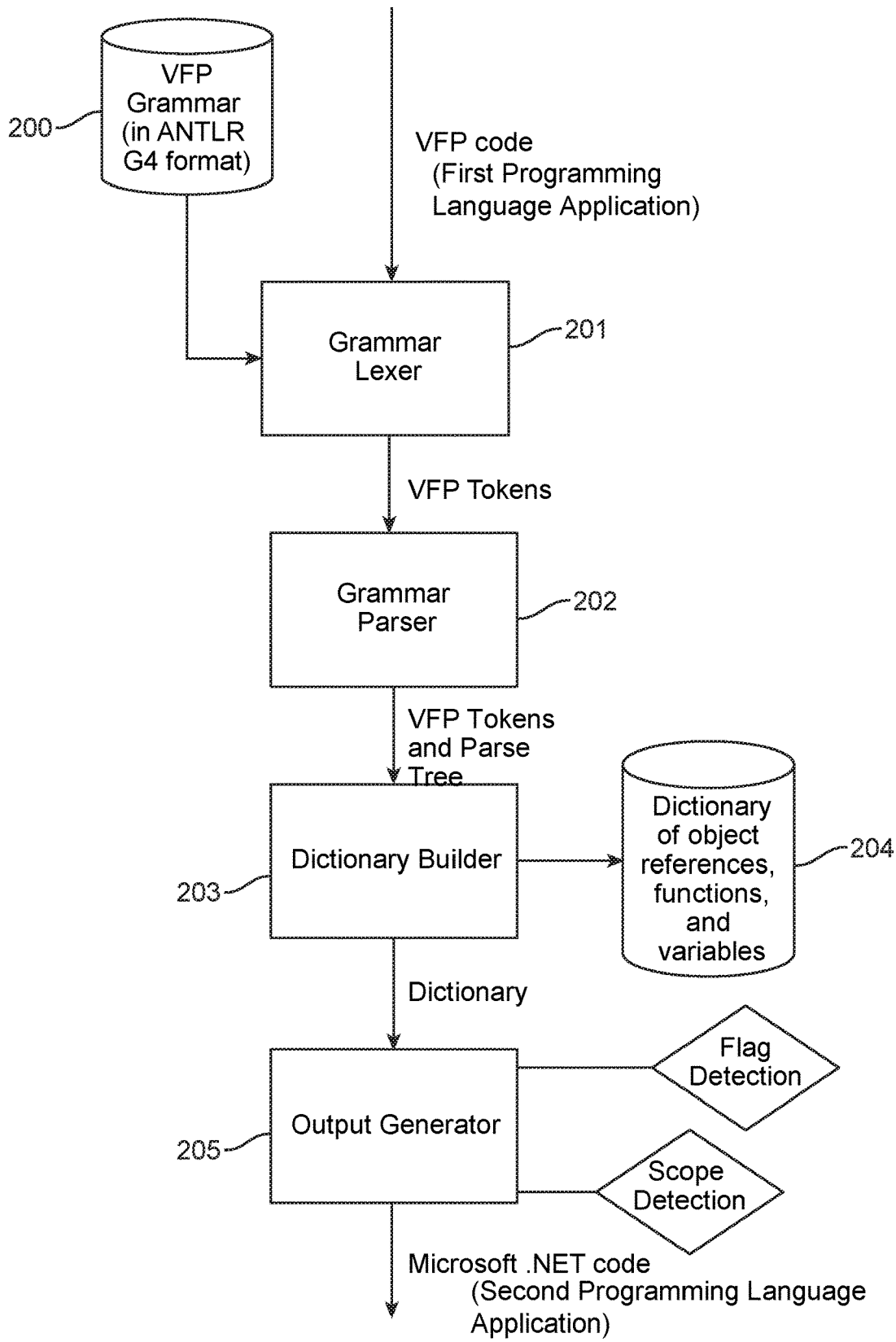
FIG. 2 is a work flow diagram of another embodiment of a method for converting a First Programming Language Application to a Second Programming Language Application in accordance with the invention.

FIG. 2 is a work flow diagram of an embodiment of the invention. The components used for processing the VFP code and generating the Microsoft.NET code disclosed herein may be divided into four-core components as in FIG.

2: Grammar Lexer 201, Grammar Parser 202, Dictionary Builder 203, and Output Generator 205.

First, the Grammar Lexer 201 is one of the four-core components. The "Grammar Lexer" as used herein is defined as the component that decomposes the input (VFP) source code into a sequence of (VFP ANTLR) tokens. ANTLR receives the VFP ANTLR grammar file 200 as input and generates the Grammar Lexer 201. The Grammar Lexer 201 receives a stream (i.e. the individual text-based characters) of VFP source code, analyzes the stream, and splits the stream into VFP ANTLR tokens. A VFP ANTLR token is a recognized object representing a VFP language construct, such as a variable name, command, or keyword, as defined herein.

Referring to FIG. 2, the second component is the Grammar Parser 202. The "Grammar Parser" as used herein is defined as the component for generating logical structures (e.g. parse trees) for understanding a stream of source input (VFP) code, as a whole. The Grammar Parser 202 is also generated by ANTLR, based on the VFP ANTLR Grammar file. The Grammar Parser 202 generates one or more parse trees from the VFP ANTLR tokens outputted by the Grammar Lexer 201. A parse tree may be thought as the "grammar" for a stream of VFP source code. Additionally, the Grammar Parser 202 verifies that the VFP ANTLR tokens adhere to the syntax rules specified in the VFP ANTLR Grammar file 200.

Third, the Dictionary Builder 203 is one of the four-core components. The Dictionary Builder 203 is the same Dictionary Builder in the embodiment described in association with FIG. 3 below. The "Dictionary Builder" used herein is defined as the component for maintaining a catalog of the variables, components, and types founded within the input source (VFP) application. During the Pass 1 112, the Dictionary Builder 203 receives VFP ANTLR tokens and parse trees as input and generates a Dictionary 204. At the end of Pass 1 112, the Dictionary 204 contains a listing of all the standard and custom types (i.e., VFP ANTLR tokens) used in the VFP source project. For example, the Dictionary Builder 203 may determine the type of variables, classes, functions, and forms and reports in the VFP source project. The Dictionary Builder 203 also determines the scope (e.g. local/private, public, external) of variables and functions encountered. The Dictionary Builder 203 also catalogs fully qualified tokens with scope information. In various embodiments, the Dictionary Builder 203 also persists the parse trees in the Dictionary 204.

Referring to FIG. 2, the fourth core component is the Output Generator 205. The "Output Generator" is used herein is defined as the component for converting/compiling a source input (VFP) code token into target code. The Output Generator 205 is the same Output Generator in the embodiment described in association with FIG. 4 below. The Output Generator 205 is responsible for converting the VFP source code into Microsoft.NET target code in Pass 2 111. Receiving the VFP project index (i.e., a listing of the VFP application files) as input, the Output Generator 205 generates the Microsoft.NET target code for each VFP application file. Specifically, the Output Generator 205 passes the name of each VFP application file to the Dictionary Builder 203. The Dictionary Builder 203 queries the dictionary and returns the parse tree and VFP ANTLR tokens associated with a particular VFP application file to the Output Generator 205. Next, the Output Generator 205 registers ANTLR Walker functions 402 (i.e. call back functions or visitors) with the parse tree, as discussed below for FIG. 4.

Although the four-core components described above were described in a specific order, it should be understood that other components may be performed among the in the four components, or components may be performed in an order other than that described, or components may be adjusted so that they occur at slightly different times.

Dictionary Builder (Pass 1)

Above, described in association with FIG. 2, discussed the four main components of the invention used for processing the VFP code and generating the Microsoft.NET code, within the multi-stage conversion method/process. This section details the work flow for one of the four main components: Dictionary Builder 203 with respect to Pass 1 112 in FIG. 1.

Figure 3:
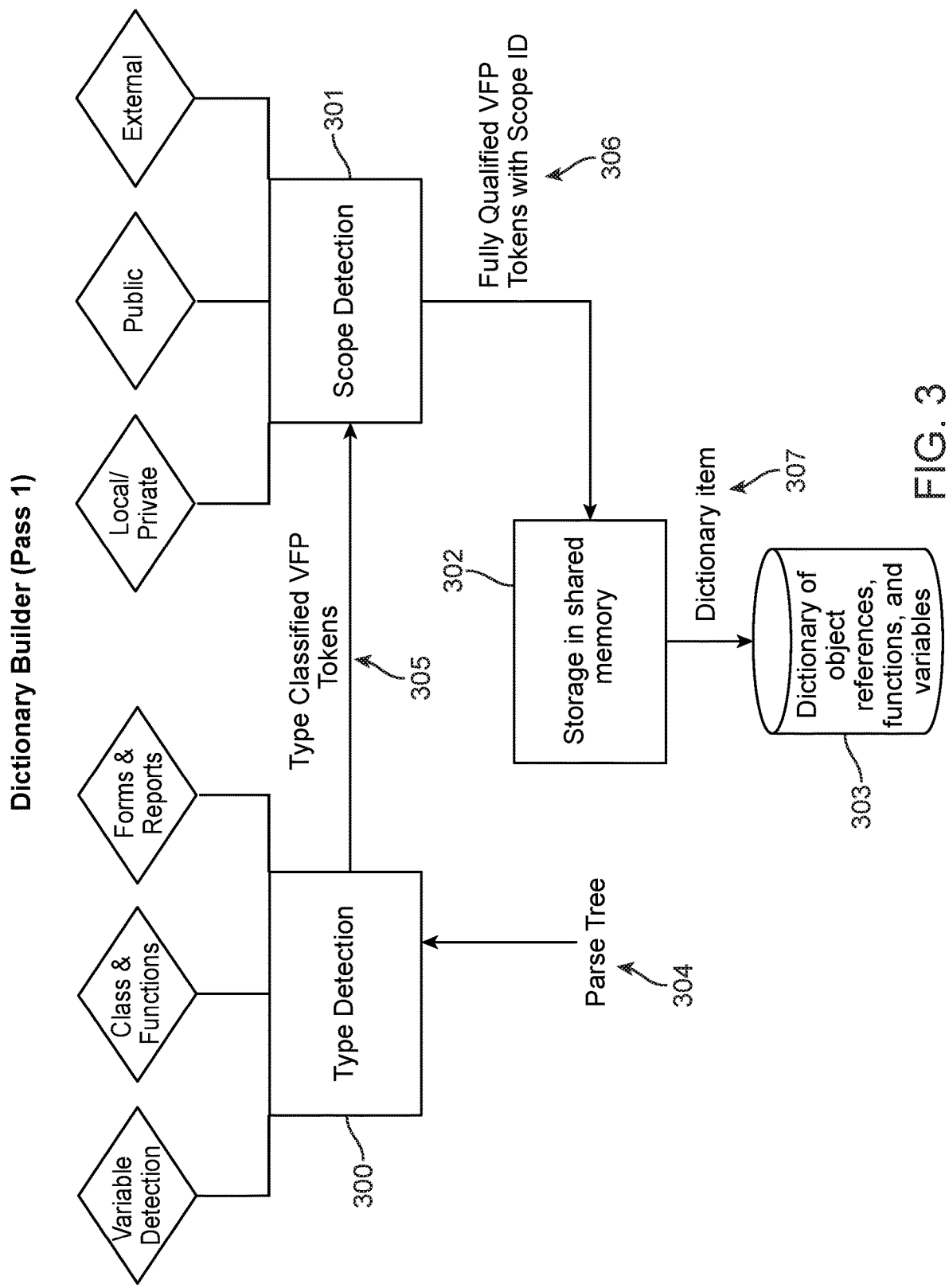
FIG. 3 is a work flow diagram of Pass 1 as performed by the Dictionary Builder in accordance with the invention.

FIG. 3 is a work flow diagram for the Dictionary Builder as described in association with FIGS. 1 & 2. At a high level, the Dictionary 303 for a VFP project is populated. The Dictionary 303 is the same dictionary in the embodiments described in association with FIGS. 1 & 2 above & 4 below. Each VFP application file (e.g., VFP form and program file) and each VFP project file encountered is cataloged in the Dictionary 303. In addition, the source code in each VFP application file is read and the VFP language constructs (e.g. classes, functions, variables) found within the source code are cataloged in the Dictionary 303.

Referring to FIG. 3, the following is received as input: a Parse Tree 304. Type Detection 300 is performed, determining whether the Parse Tree 304 contains VFP variables, classes/functions, and/or forms reports. As an intermediate output, Type Classified VFP Tokens 305 (i.e. annotated with type) are generated for the Parse Tree 304. Next, Scope Detection 301 is performed, determining the scope (e.g. Local/Private, Public or External scope) of the Type Classified VFP Tokens 305. Scope is defined as a region of the application where a defined variable can have its existence and beyond that variable cannot be accessed. As an intermediate output, Fully Classified VFP Tokens 306 (i.e. annotated with type and scope) are generated for the Parse Tree 304. Finally, the Fully Classified VFP Tokens 306/Parse Tree 304 are persisted to Shared Memory 302 and stored in the Dictionary 303 as Dictionary Items 307.

Output Generator (Pass 2)

Above, described in association with FIG. 2, discussed the four main components of the invention used for processing the VFP code and generating the Microsoft.NET code, within the multi-stage conversion method/process. This section details the work flow of one of the four main components: Output Generator 205 with respect to Pass 2 111 in FIG. 1.

FIG. 3 is a work flow diagram for the Output Generator 205 as described in association with FIGS. 1 & 2. At a high level, the Output Generator 205 receives the Dictionary 303 (401) as input and each VFP application files (in a VFP project) is converted to the corresponding Microsoft.NET application files (in the Microsoft.NET target project), respectively. (The Dictionary 303 is the same dictionary in the embodiments described in association with FIGS. 1,2 & 3). The source code in each VFP application file is converted into the corresponding Microsoft.NET target code. The resulting Microsoft.NET target code is populated in the appropriate location (e.g. file, class, or function) based on the MVC framework.

Moreover, each VFP program file is converted into a corresponding C# class in the business logic section (i.e. the controller) of the Microsoft.NET target project. Additionally, the member functions of each VFP program file become the member functions of a corresponding C# class. If a VFP program file contained the VFP code:
SET PROCEDURE to common.prg
FooBar( )
The corresponding C# class generated for the VFP program file (common.prg):
Common prg_common=new Common( )
C# class
To invoke the member function FooBar( ) in the corresponding C# class:
prg_common.FooBar( )

Another example is for the VFP report. Each VFP report is converted into a corresponding report RDLC (Reporting Template) for the SQL Server and SQL Server Reporting Services (in the Microsoft.NET target project). The VFP report contains source code in field expressions, report parameters, fields, and variables. This source code in the field expressions of the VFP report is converted to VBA (Visual Basic for Application) target code and populated in the corresponding report RDLC.

VFP form conversions depend upon the VFP form's type. Non-VFP desktop forms are converted as follows: for each VFP form (i.e. non-VFP desktop form), a corresponding Angular 4/5 form is generated. A Typescript file for each corresponding Angular 4/5 form is generated to handle the Angular 4/5 form's events, as well as the Angular component handlers. Also, HTML code (linked with Angular components) is generated for each corresponding Angular 4/5 form. If the VFP form contains one or more of VFP controls, the corresponding Microsoft.NET control or controls are generated, respectively.

Furthermore, the code that runs behind the VFP form and its VFP controls (i.e., VFP control events) are converted to C# Web API and populated in a corresponding C# class. Web services are linked with the Angular services and component events. In the web services (in the corresponding C# controller class), JavaScript (instead of C#) is generated, whenever an Angular 4/5 form control property is changed. JavaScript commands are returned to Angular events as string objects, which may be executed, on the client browser side.

For VFP desktop forms, the conversion is to the corresponding ASP.NET Angular JS and HMTL forms.

Figure 4:
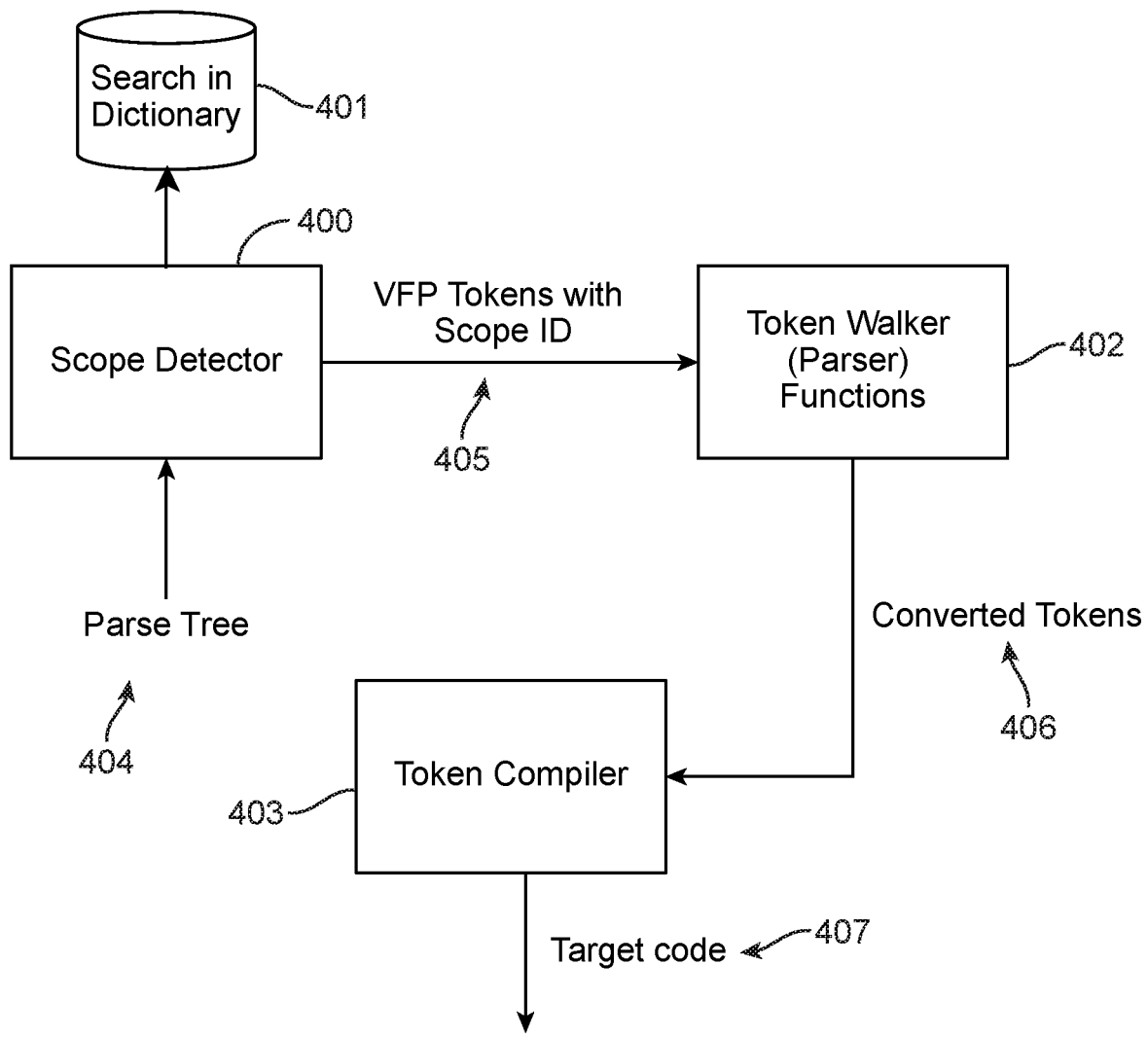
FIG. 4 is a work flow diagram of Pass 2 as performed by the Output Generator in accordance with the invention.

Referring to FIG. 4, the following are received as input: a Parse Tree 404 and Dictionary 401. The Scope Detector 400 passes the Parse Tree 404 to the Dictionary 401, receiving VFP Tokens with Scope ID 405 (i.e. with scope identification). As an intermediate output, the VFP Tokens with Scope ID 405 are passed to the Token Walker (Parser) Functions 402, generating Converted Tokens 406. Detailed illustration of the Token Walker (Parser) Functions 402 is presented below. Finally, the Converted Tokens 406 are sent to the Token Complier 403 to be complied into Target Code 407.

Referring to FIG. 4, the Token Walker (Parser) Functions 402 are used to convert VFP ANTLR tokens into Microsoft.NET target code (e.g. C# or VBA). Some Token Walker (Parser) Functions 402 are used to detect flags (i.e. conditions) in VFP ANTLR tokens. For example, "isCondition" is a flag detected by a Token Walker (Parser) Function to ensure that a VFP ANTLR token condition "=" is properly converted to "==" in C#. Another example of a flag detected by a Token Walker (Parser) Function is "IsSqlCommand." The "IsSqlCommand" flag is raised when the corresponding Token Walker function detects that a VFP ANTLR token is a SQL statement. The SQL statement is surrounded by string quotes when this SQL statement is converted to the Microsoft.NET target code.

In addition, Token Walker (Parser) Functions 402 are used to convert VFP commands (found in VFP ANTLR tokens). For example, here are the ANTLR Walker functions for converting a VFP "For Statement Command" to a C# "For Loop."

```
public override void EnterForStmt([NotNull] FoxProParser.
ForStmtContext context)
{
ScopesDomain.ScopePush(RunningPass.Pass2);
OutputManager.WriteLine("");
OutputManager.Write(new ExpressionStack( ) { Name = "for(" });
base.EnterForStmt(context);
}
public override void EnterForblock([NotNull] FoxProParser.
ForblockContext context)
{
OutputManager.Write (new ExpressionStack( )
{
Name = ") "
});
OutputManager.WriteLine(new ExpressionStack( )
{
Name = "{ "
});
base.EnterForblock(context);
}
public override void ExitForStmt([NotNull] FoxProParser.
ForStmtContext context)
{
ScopesDomain.ScopePop(RunningPass.Pass2);
OutputManager.WriteLine(new ExpressionStack( )
{
Name = "} "
});
base.ExitForStmt(context);
}
```

These Token Walker (Parser) Functions detect the parts of the VFP "For Statement Command" and build the corresponding C# "For Loop."

Now having discussed the Token Walker (Parser) Functions 402, let's turn our attention to how ANTLR Walker functions 402 interact with the Output Generator 205 and parse trees in FIG. 2.

Referring to FIG. 2, the Output Generator 205 iteratively sends code snippets (i.e. VFP ANTLR tokens) to the parse tree and walks the parse tree. The Token Walker (Parser) Functions 402 are fired during the parse tree walk. Receiving responses from fired Token Walker (Parser) Functions 402, the Output Generator 205 outputs the corresponding Microsoft.NET target token 407 (i.e. code) in FIG. 4.

Alternative embodiments may perform one or more of the following procedures to convert a VFP project (and VFP source code) to a Microsoft.NET target project (and Microsoft.NET target code):

Resolving the VFP multi-line commands
Removing VFP unnecessary tokens
Resolving VFP errors
Generating log
VFP Multi-Line Commands While interpreting the source code of each VFP application file, VFP multi-line commands may be encountered. A VFP multi-line command is a single VFP instruction that spans more than one line within a stream of VFP source code. Semicolons ";" are used to denote the lines (except the last line) within a single VFP multi-line command. For example, consider this VFP multi-line command/SQL statement:

```
SELECT *;
FROM a table;
WHERE CONDITION;
INTO CURSOR xy
```
The semicolons indicate that the four lines (e.g. select, from, where, into) belong to a single VFP multi-line command (i.e. SQL statement) and the four lines should be interpreted as a single VFP command. Various embodiments translate the VFP multi-line commands into the corresponding Microsoft.NET single line commands.

Unnecessary VFP Tokens

While interpreting the source code of each VFP application file, unnecessary VFP tokens (e.g. blank spaces) may be encountered. Various embodiments may ignore or remove the unnecessary VFP tokens from the stream of VFP source code.

VFP Errors

In various embodiments, VFP error or VFP source code that cannot be converted may be encountered. The various embodiments document the VFP errors into a log file.

Log

The various embodiments record the steps executed and VFP errors encountered into a log file.

Functional and Physical Implementation of the Invention

Embodiments described in the present disclosure may be practiced with various computer systems and distributed computing environments (e.g. cloud architecture), where functions or processes (methods) are performed by remote processing devices that communicate through a wireless or wired-based network. The components may be implemented in hardware only, software only, or in any combination of hardware and software. Further, the components may be practiced with various computer systems and distributed computer environments, where communication between or among the components may be practiced with any communication protocol (e.g. USB, TCP/IP, or Bluetooth).

The software may be practiced with computer programs written in accordance with the teachings herein, or it may be more convenient to construct more specialized methods to perform the required operations or functions.

With the above embodiments in mind, it should be understood that a number of embodiments described in the present disclosure can employ various computer-implemented operations involving data stored in computer systems. These operations are those requiring physical manipulation of physical quantities. Any of the operations described herein that form part of various embodiments described in the present disclosure are useful machine operations. Several embodiments described in the present disclosure also relates to a system or a method for performing these operations or functions.

Figure 5:
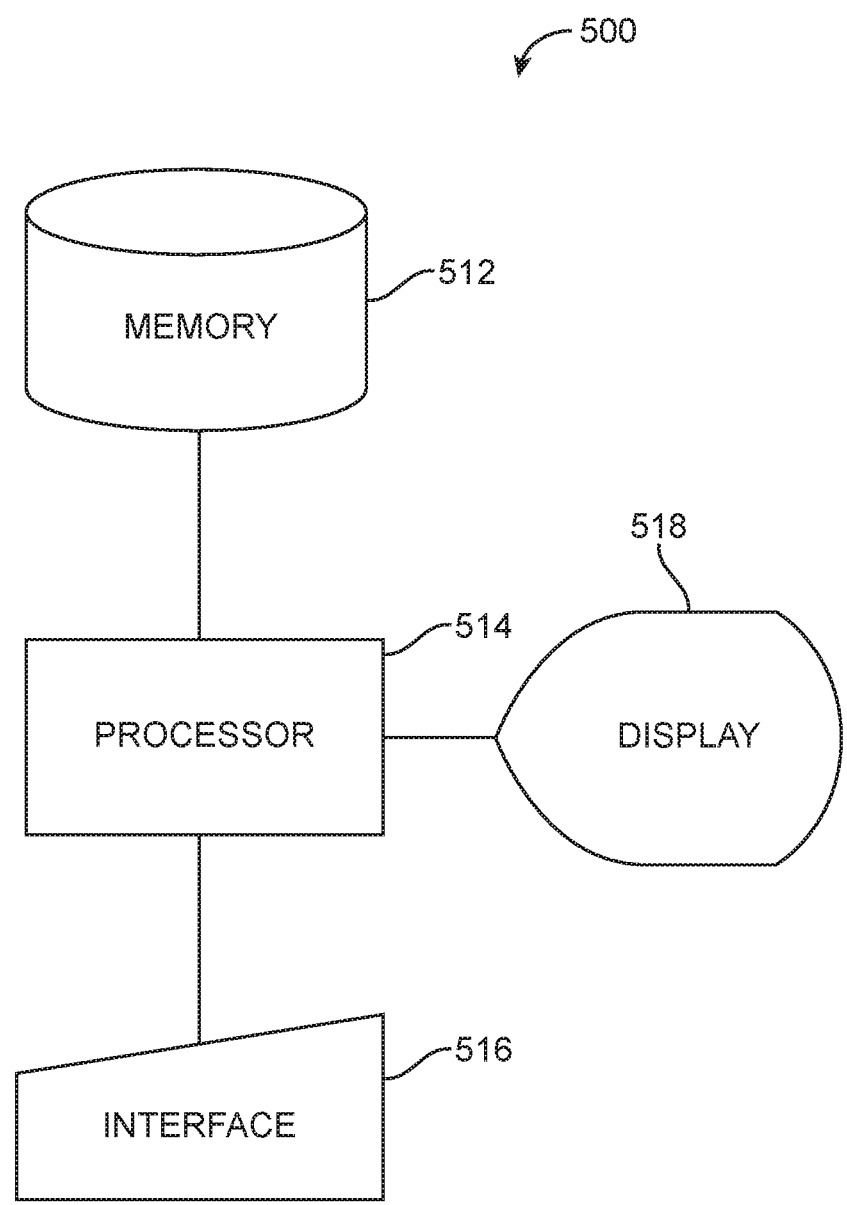
FIG. 5 is a schematic diagram of architecture for a conversion system in accordance with the invention.

It should be understood that the calculations may be performed by any suitable computer system, such as that diagrammatically shown in FIG. 5. Data is entered into system 500 via any suitable type of user interface 516, and may be stored in memory 512, which may be any suitable type of computer readable and programmable memory and is preferably a non-transitory, computer readable storage medium. Calculations are performed by processor 514, which may be any suitable type of computer processor and may be displayed to the user on display 518, which may be any suitable type of computer display.

Processor 514 may be associated with, or incorporated into, any suitable type of computing device, for example, a personal computer or a programmable logic controller. The display 518, the processor 514, the memory 512 and any associated computer readable recording media are in communication with one another by any suitable type of data bus, as is well known in the art.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that may be used in addition to memory 512, or in place of memory 512, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable media include all computer-readable media except for a transitory, propagating signal.

Various embodiments described in the present disclosure can also be embodied as computer-readable code on a non-transitory computer-readable medium. The computer-read-able medium is any data storage device that can store data, which can be thereafter be read by a computer system. Examples of the computer-readable medium include hard drives, network attached storage (NAS), ROM, RAM, compact disc-RO Ms (CD-RO Ms), CD-recordables (CD-Rs), CD-rewritables (RWs), magnetic tapes and other optical and non-optical data storage devices. The computer-readable medium can include computer-readable tangible medium distributed over a network-coupled computer system so that the computer-readable code is stored and executed in a distributed fashion.

All present embodiments are to be considered as illustrative and not restrictive, and the various embodiments described in the present disclosure is not to be limited to the details given herein, but may be modified within the scope and equivalents of the appended claims.

What is claimed is:

1. A computer-implemented method for converting a First Programming Language Application to a Second Programming Language Application, the method comprising:
   receiving for the First Programming Language Application a Grammar file, Source Project, and Target Project, the First Programming Language Application having backend databases coupled to graphic user interfaces;
   generating tabular data for the Source Project;
   generating for the First Programming Language Application a listing of Source Application files and Source Project files;
   generating blank code files for the Second Programming Language Application;
   iterating through First Programming Language Application files to generate corresponding Second Programming Language Application files, wherein one or more of the First Programming Language Application files contains code-behind;
   setting up a Second Programming Language Application target project containing Second Programming Language Application files;
   converting First Programming Language Application modules to generate corresponding Second Programming Language Application files;
   building a dictionary for the First Programming Language Application by executing a first pass through the First Programming Language Application;
   generating Second Programming Language Application files with the dictionary in the form of a plurality of controller functions, classes and report expressions by executing a second pass; and stitching the Second Programming Language Application files together into the Second Programming Language Application, the Second Programming Language Application having core functionality separated from user interface behavior.

2. The method of claim 1, wherein the First Programming Language Application is characterized by high coupling.

3. The method of claim 1, wherein the Second Programming Language Application is characterized by low coupling.

4. The method of claim 1, wherein the First Programming Language Application is a VFP Application.

5. The method of claim 1, wherein the Second Programming Language Application is a Microsoft.NET Application.

6. The method of claim 1, wherein the Grammar file is a VFP ANTLR Grammar file.

7. The method of claim 1, further comprising resolving the VFP multi-line commands.

8. The method of claim 1, further comprising removing VFP unnecessary tokens.

9. A computer-implemented system for migrating a First Programming Language Application to a Second Programming Language Application, preserving the business logic of the First Programming Language Application, the system comprising:
    a processor; and
    a memory communicatively coupled to the processor, wherein the memory stores processor instructions, which, on execution, cause the processor to:
    receive for the First Programming Language Application a Grammar file, Source Project, and Target Project, the First Programming Language Application having back-end databases coupled to graphic user interfaces;
    generate tabular data for the Source Project;
    generate for the First Programming Language Application a listing of Source Application files and Source Project files;
    generate blank code files for the Second Programming Language Application;
    iterate through First Programming Language Application files to generate corresponding Second Programming Language Application files, wherein one or more of the First Programming Language Application files contains code-behind;
    set up a Second Programming Language Application target project containing Second Programming Language Application files;
    convert First Programming Language Application modules to generate corresponding Second Programming Language Application files;
    build a dictionary for the First Programming Language Application by executing a first pass through the First Programming Language Application;
    generate Second Programming Language Application files with the dictionary in the form of a plurality of controller functions, classes and report expressions by executing a second pass; and
    stitch the Second Programming Language Application files together into the Second Programming Language Application, the Second Programming Language Application having core functionality separated from user interface behavior.

10. The system of claim 9, wherein the First Programming Language Application is characterized by high coupling.

11. The system of claim 9, wherein the Second Programming Language Application is characterized by low coupling.

12. The system of claim 9, wherein the First Programming Language Application is a VFP Application.

13. The system of claim 9, wherein the Second Programming Language Application is a Microsoft.NET Application.

14. The system of claim 9, wherein the Grammar file is a VFP ANTLR Grammar file.

15. A system for migrating a of First Programming Language Application to a Second Programming Language Application, the First Programming Language Application having backend databases coupled to graphic user interfaces and the Second Programming Language Application having core functionality separated from user interface behavior, the system comprising:
    a Grammar Lexer configured to receive a Grammar file and a stream of First Programming Language Application source code and generate tokens;
    a Grammar Parser configured to receive the tokens and to generate a parse tree, verifying that the tokens adhere to syntax rules in the Grammar file;
    a Dictionary Builder configured to receive the tokens and to parse trees and populate a dictionary, the Dictionary Builder being further configured to generate for the of First Programming Language Application a listing of standard types, custom types, and scopes; and
    an Output Generator configured to receive the dictionary and a project index for the of First Programming Language Application and to generate Second Programming Language Application code for each of the of First Programming Language Application files, thereby converting each First Programming Language Application file into the corresponding Second Programming Language Application file;
    wherein generating Second Programming Language Application comprises:
    iterating through First Programming Language Application files to generate corresponding Second Programming Language Application files, wherein one or more of the First Programming Language Application files contains code-behind;
    converting First Programming Language Application modules to generate corresponding Second Programming Language Application files;
    building the dictionary for the First Programming Language Application via a first passthrough using the Dictionary Builder;
    generating Second Programming Language Application files with the dictionary in the form of a plurality of controller functions, classes and report expressions via a second pass using the Output Generator; and
    stitching the Second Programming Language Application files together into the Second Programming Language Application, the Second Programming Language Application having core functionality separated from user interface behavior.

16. The system of claim 15, wherein the First Programming Language Application is characterized by high coupling.

17. The system of claim 15, wherein the Second Programming Language Application is characterized by low coupling.

18. The system of claim 15, wherein the First Programming Language Application is a VFP Application.

19. The system of claim 15, wherein the Second Programming Language Application is a Microsoft.NET Application.

20. The system of claim 15, wherein the Grammar file is a VFP ANTLR Grammar file.

* * * * *